United States Patent
Balfour

(10) Patent No.: US 11,819,762 B1
(45) Date of Patent: Nov. 21, 2023

(54) REGISTRATION AND CONTROL OF A GAME ENTITY AS A DEVICE

(71) Applicant: Amazon Technologies, Inc., Seattle, WA (US)

(72) Inventor: Michael Aaron Balfour, Georgetown, TX (US)

(73) Assignee: Amazon Technologies, Inc., Seattle, WA (US)

( * ) Notice: Subject to any disclaimer, the term of this patent is extended or adjusted under 35 U.S.C. 154(b) by 188 days.

(21) Appl. No.: 17/396,438

(22) Filed: Aug. 6, 2021

(51) Int. Cl.
*A63F 13/57* (2014.01)

(52) U.S. Cl.
CPC .................... *A63F 13/57* (2014.09)

(58) Field of Classification Search
CPC .......... A63F 13/57; A63F 13/60; A63F 13/70; A63F 13/71; A63F 2300/60
USPC .......................................................... 463/31
See application file for complete search history.

(56) References Cited

U.S. PATENT DOCUMENTS

| | | | |
|---|---|---|---|
| 10,382,307 B1* | 8/2019 | Jindal | H04L 43/0876 |
| 10,708,376 B2* | 7/2020 | Seed | H04L 67/51 |
| 11,026,090 B2* | 6/2021 | Rubin | H04L 67/562 |
| 11,045,730 B1* | 6/2021 | Goldman | A63F 13/213 |
| 2020/0021586 A1* | 1/2020 | Schmidt | H04L 63/20 |
| 2021/0304559 A1* | 9/2021 | Cupersmith | G06Q 20/3674 |

OTHER PUBLICATIONS

Wikipedia, "IEEE 802.15", https://en.wikipedia.org/wiki/IEEE_802.15, Jul. 2, 2021, 8 pages.

* cited by examiner

*Primary Examiner* — Allen Chan
(74) *Attorney, Agent, or Firm* — Davis Wright Tremaine LLP

(57) ABSTRACT

In various embodiments described in the present disclosure a game engine subscribes entities within a game environment to topics and provides payloads associated with the topics to entities within the game environment. For example, the game engine registers a first entity to a first topic and provides the first entity with a payload associated with the first topic as a result of the first entity being subscribed to the first topic. In some embodiments, the game engine also registers as an IoT device in order to expose functionality.

20 Claims, 7 Drawing Sheets

US 11,819,762 B1

REGISTRATION AND CONTROL OF A GAME ENTITY AS A DEVICE

BACKGROUND

Electronic devices and computing systems have become ever-present in many aspects of society. Devices are found in the workplace, at home, and at school. Computing systems may include computing and data storage systems to process and store data. In addition, some of these computing systems can be used to execute virtual environments such as virtual game environments that are created using game engines. Furthermore, advancements in communication technologies have allowed for even relatively simple electronic devices to communicate with other devices and computing systems over a computer network. Computing networks or service provider environments may also communicate with Internet of Things (IoT) devices to gather and generate data or perform other functions. Computing devices, including IoT devices, can communicate with each other or with other networked devices using various protocols. The various protocols may be employed by the computing devices to send and receive data from other devices. Despite advances with connectivity of devices, there is a disconnect between virtual and physical environments and, consequently, abilities to take advantages of advances in technology have significant limitations.

BRIEF DESCRIPTION OF THE DRAWINGS

Various techniques will be described with reference to the drawings, in which.

DETAILED DESCRIPTION

Figure 1:
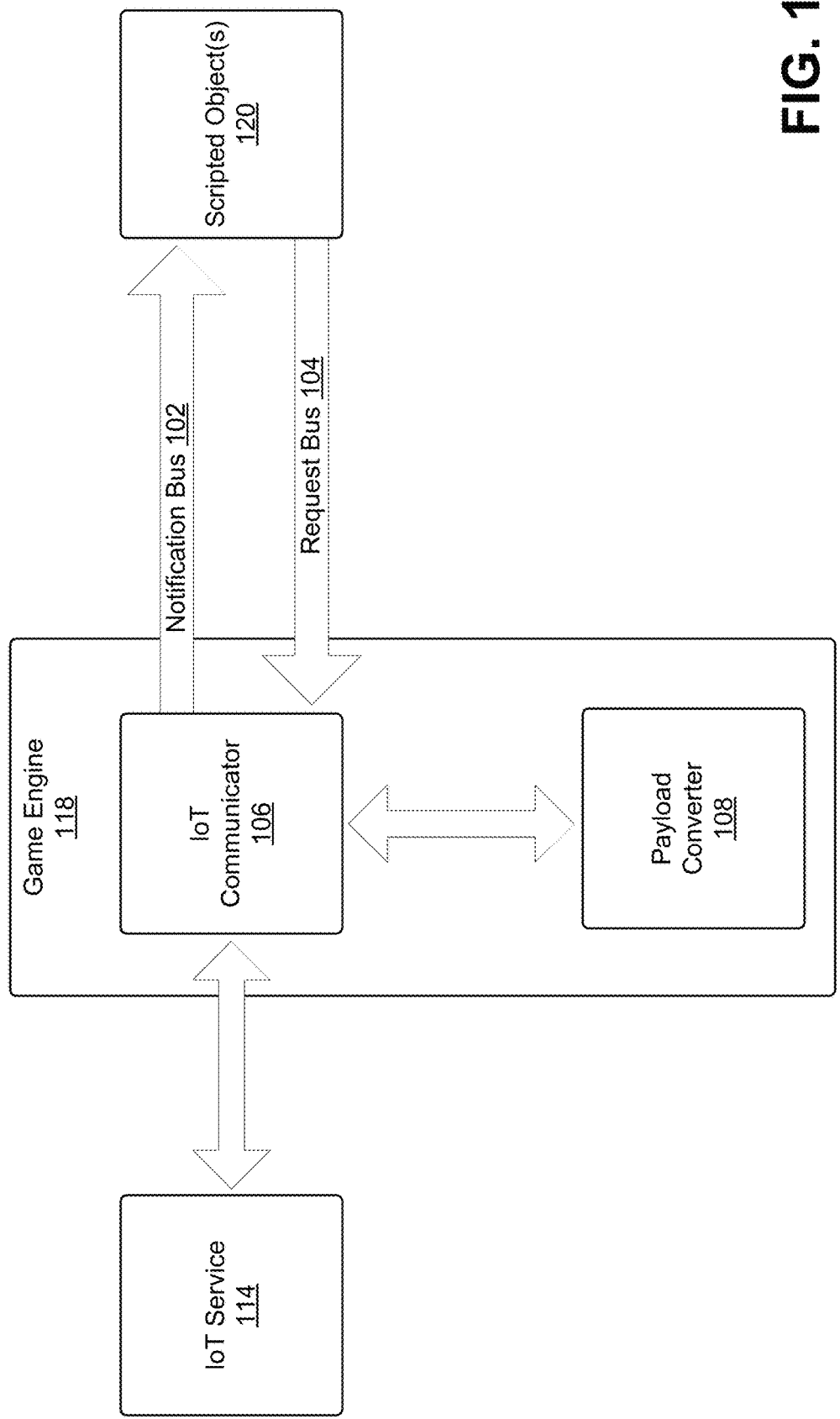
FIG. 1 shows an illustrative example of an environment in which a game engine utilizes an IoT service to enable communication with scripted objects associated with the game engine in accordance with an embodiment.

Systems and methods are described for enabling game engines and entities within the game engines to interact with computing devices, such as Internet of Things (IoT) devices. As described in greater detail below, a game engine utilizes an IoT service to provide functionality (e.g., communication and control) of IoT ecosystems to entities within the game engine and exposes the functionality of the game engine to the IoT ecosystems for externalized communication and control of the game engine environment. In this manner, entities (e.g., scripted objects) within a game environment generated by the game engine can communicate with IoT devices. Similarly, entities within the game environment can communicate with other entities within the game environment, including that game engine itself, using the IoT service thereby extending the functionality of the game engine to include operations of the IoT service. In addition, utilizing the IoT service enables communication and control of the entire game environment as well as IoT devices and/or entities within the game environment without the need to write additional source code to support those operations.

As described in greater detail below, the entities within the game engine include any object that has a script or other executable logic associated with it such as virtual representations of lights, terrain, vehicles, people, animals, buildings, devices, or anything else that can be represented virtually including abstract logic within a game environment. In some examples, a particular entity can simply include executable logic (e.g., if 'X' occurs do 'Y') without a corresponding virtual representation within the game environment. Furthermore, the game engine can, in various examples, register these entities with the IoT service to enable communication and control as described in the present disclosure. For example, the IoT service and/or components thereof maintain topics associated with these entities, these topics enable distribution of payloads (e.g., communications) with entities and/or IoT devices that subscribe to the topics. In addition, the game engine can be registered with the IoT service to enable communication and control of the entire game engine as described in the present disclosure. For example, by registering the game engine with the IoT service, payloads obtained from various IoT devices can trigger operations of the game engine such as modifying the game environment.

Entities in the game environment can be associated with specific scripts or other executable logic that transmit payloads to the IoT service (e.g., in response to an event, input, or other stimulus) and/or perform operations in response to obtaining payloads from the IoT service. In one example, a virtual representation of a player (e.g., the person playing the game) interacts with a virtual representation of a button within a game environment which causes the game engine to execute a script, source code, or other logic associated with the button that causes a payload to be transmitted to the IoT service. In such examples, the IoT service publishes the payload to the topic associated with the button and IoT devices and other entities within the game environment that subscribe to the topic may receive the payload, a portion thereof, or other data generated based at least in part on the payload. For example, the IoT service can convert the payload into a command for an IoT device (e.g., lights, smart speaker, television, etc.) to turn on.

The game engine, to enable this type of communication, in at least one example, generates a request bus and a notification bus. For example, the request bus can include a communication channel provided by the game engine to allow entities to transmit payload (e.g., trigger the game engine to transmit data to the IoT service in response to executing logic associated with the entity). Similarly, the notification bus is a communication channel provided by the game engine to transmit commands from the IoT service to the entities and/or game engine. For example, modifying the color and/or intensity of an IoT light causes the IoT service to transmit a corresponding payload to subscribers of a topic associated with the IoT light which can include a virtual representation of the IoT light (e.g., an entity) within the game environment generated by the game engine. Furthermore, in such examples, executable logic associated with the virtual representation of the IoT light within the game environment may, as a result of being executed in response to obtaining the payload, cause the game engine to modify the color and/or intensity of the virtual representation of the IoT light within the game environment to match the IoT light (e.g., the IoT device in the real world).

As described in greater detail below, payloads generated by IoT devices and/or entities within the game environment can be of different formats and therefore require conversion. In one example, a payload converter of the game engine obtains a payload from the IoT service, the payload is generated by an IoT device, and converts the payload into a format expected by the game engine and/or executable logic associated with an entity within the game environment. In other examples, the IoT service converts payload data into a format useable by subscribers to a topic. For example, a particular type of IoT device encodes three values (e.g., RGB) in a payload representing a color of a light included in the IoT device and the game engine utilizes four values to represent light color (e.g., CMYK), as a result the payload converter converts the three values included in the payload to the four values expected by the game engine.

In the preceding and following description, various techniques are described. For purposes of explanation, specific configurations and details are set forth in order to provide a thorough understanding of the possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) enabling communications between game environments and real world environments, (2) enabling digital twin environments that accurately reflect physical environments, (3) exposing the functionality of game engines to IoT devices and services, (4) leveraging IoT communication channels to allow communication and control between entities within a game environment, and (5) leveraging IoT communication channels to allow communication and control between entities within a game environment and physical IoT devices.

FIG. 1 illustrates an environment 100 in which a game engine 118 registers one or more scripted object(s) 120 with an IoT service 114 in accordance with an embodiment. In particular, in the embodiments illustrated in FIG. 1, the game engine 118 utilizes the IoT service 114 to enable communication and control of entities within the game engine 118 associated with the one or more scripted object(s) 120. In various embodiments, the game engine 118 comprises a software or other executable code that provides a set of tools and/or features for developing games and creating a game environment (e.g., a virtual environment generated by the game engine 118). For example, the game engine 118 includes a highly-performant real-time engine that provides responsive interactivity with virtualized environments. In one example, a developer can utilize a user interface of the game engine 118 to create a virtual game environment including entities within the game environment such as players, objects, lights, backgrounds, and other virtual representations. Furthermore, in various embodiments, these entities can be associated with scripted object(s) 120 in order to perform various operations within the game environment. In one example, a light within the game environment is associated with a scripted object 120 that includes source code or other executable logic that performs various operations enabled by the game engine 118 such as lighting the game environment, displaying colors within the game environment, displaying a lighting pattern within the game environment, and any other operations that the game engine 118 enables for entities within the game environment.

In various embodiments, physical IoT devices are virtualized (e.g., simulated by one or more computer systems) and transmit payloads to the IoT service. In addition, in various embodiments, the IoT service includes executable code or other logic that generates commands from the game engine based at least in part on the payloads obtained. In one example, a game engine is registered as an IoT device with the IoT service, as such the IoT service includes executable code that, as a result of being executed, generates commands (e.g., packaged as payloads to transmit to the game engine using an IoT communication protocol) in response to payloads obtained from other IoT devices. Turning to a specific example, a status change update included in a payload from a smart light bulb (e.g., color change, on/off, etc.) causes the IoT service to, as a result of executing the executable code, generate a command to the game engine to perform an operation (e.g., create a game entity, modify a game entity, etc.) and include the command in a payload published to the game engine as a result of the game engine subscribing to a particular topic.

In various embodiments, the scripted object(s) 120 include source code or other executable logic (e.g., written by a developer or included in the game engine 118) that, as a result of being executed by the game engine 118, causes various operations described in the present disclosure to be performed. In one example, as described in greater detail below, the scripted object(s) 120 include executable logic that causes the game engine 118 to register an entity within the game environment with the IoT service 114. In such examples, the game engine 118 utilizes a notification bus 102 to provide payload data from the IoT service 114 to the entity (e.g., the scripted object(s) 120 associated with the entity) to enable operations to be performed in response to obtaining the payload. Similarly, in such examples, the game engine 118 utilizes a request bus 104 to transmit payload data from the scripted object(s) 120 to the IoT service 114.

In various embodiments, the IoT service 114 comprises a collection of computing resources that implement various communication protocols to enable communication between entities within the game environment and/or IoT devices as described in the present disclosure. For example, the IoT service 114 includes a service provided by a computing resource service provider. In various embodiments, the computing resource service provider provides computing resources to perform various operations as described in the present disclosure. For example, the computing resource service provider provides computational and storage resources to execute the game engine 118 and provide communication networks to enable communication between entities within the game environment and/or IoT devices as described in the present disclosure. In various embodiments, the game engine is executed by computing resources not operated by the computing resource service provider such as a client device or other computer system including the electronic client device 702 described below in connection with FIG. 7. In another example, the computing resource service provider (although not shown in FIG. 1 for simplicity) provides computational and storage resources for game engine 118 and/or IoT services 114.

Furthermore, in various embodiments, the game engine 118 includes an IoT communicator 106 which includes source code or other executable logic to register entities within the game environment with the IoT service 114 and support communication between the entities and the IoT service (e.g., by providing the notification bus 102 and the request bus 104). In various embodiments, the notification bus 102 and the request bus 104 include communication channels within the game engine 118 for passing data. For example, the notification bus 102 and the request bus 104 can include virtualization of a physical bus or other communication channel. In yet other embodiments, the notification bus 102 and the request bus 104 include a memory location and/or pointer to a memory location accessible to the game engine 118 and/or entities within the game environment.

In various embodiments, interactions with and/or operations of the entities within the game environment cause the execution of the scripted object(s) 120. Furthermore, as described in greater detail below, the IoT communicator 106, in an embodiment, registers the entities with the IoT service 114. In such embodiments, the scripted object(s) 120 in response to interactions with and/or operations of entities within the game environment generate a payload and transmit the payload over the request bus 104 to the IoT communication 106 which publishes the payload to the IoT service 114. In one example, a spotlight within the game environment is associated with a particular scripted object that causes the IoT communicator 106 to register the spotlight to a corresponding topic provided by the IoT service. In embodiments, where other IoT communication protocol are used messaging channels are used in place of topics. In addition, in such examples, the particular scripted object includes executable logic that transmits data over the request bus 104 to the IoT communicator 106 in response to a status change of the spotlight (e.g., interaction within the game environment, modification by the game engine 118, color change, change in intensity, etc.).

In an embodiment, the IoT service 11 and one or more hub devices (e.g., hub device 304 described in greater detail below in connection with FIG. 3) implement one or more communication protocols, including message queuing telemetry transport (MQTT), advanced message queuing protocol (AMQP), extensible messaging and presence protocol (XMPP), data distribution service (DDS), hypertext transfer protocol (HTTP), and/or constrained application protocol (CoAP) to enable communication between the entities within the game environment and/or the IoT devices. In one example, ringing a virtual representation of a doorbell within the game environment that is registered to a topic provided by the IoT service 114, causes the game engine 118 or component thereof (e.g., the scripted object(s) 120) to provide a payload in accordance with the one or more communication protocols to the IoT communicator 106 for publishing to the topic. In turn, the IoT service 114, in such examples, can provide the payload data to other IoT devices subscribed to the topic (e.g., a smart doorbell), these IoT devices can then perform operations (e.g., play a sound) in response to obtaining the payload.

In other examples, a physical IoT device (e.g., a button or switch) sends a single message and/or payload through an IoT service to both a physical device and a virtual game entity, where the physical device and the virtual game entity include executable code that interprets the message (e.g., performs an operation). In such examples, the operations of the physical device and the virtual game entity can be synchronous (e.g., a virtual and a physical light are turned on by the switch) or asynchronous (e.g., the switch changing the color of a physical light to green and causing a treasure chest in a game to open to reveal a glowing green orb). Any number or type of operations that are enabled by IoT devices, an IoT service, and/or game engines are within the scope of the present disclosure.

In an embodiment, the topic subscriptions are in a hierarchical string format. For example, the topic subscriptions assigned to the entities and/or the IoT devices can be in MQTT topic string format. In various embodiments, the MQTT protocol employs topic strings to separate the space of messages, similar to directories and subdirectories in hierarchical file systems. The entities and/or the IoT devices publish messages and/or cause messages (e.g., payload or other data) to be published to topics, and the entities and/or the IoT devices that are subscribed to topics in order to receive messages for topics that the entities and/or the IoT devices are subscribed to.

By way of example, a message published to a topic string of: "topic1/x1/y2/z3/data" would be received by any entities and/or IoT devices subscribed to: "topic1/x1/y2/z3/data." In an embodiment, the IoT service facilitates routing of messages published to a topic, such as routing messages to any entities and/or IoT devices that are subscribed to that topic. Furthermore, the IoT service 114 and/or the IoT communicator 106, in an embodiment, includes a multiplexer or other component to publish messages to a plurality of subscribers (e.g., entities and/or IoT devices subscribed to a particular topic). In one example, the IoT service 114 accepts only a single subscriber to a topic and the IoT communication 106 multiplexes messages to a plurality of entities within the game environment that subscribe to the topic.

In various embodiments, MQTT protocol also can use wildcards in topic strings for subscriptions. In MQTT the wildcard "+" matches one level and wildcard "#" matches any number of levels below. Wildcard "#" matches any number of topic levels, so the following subscriptions would match to the published topic string: "topic1/x1/y2/z3/data":
"topic1/x1/y2/z3/#"
"topic1/x1/y2/#"
"topic1/x1/#"
"topic1/#"
"topic1/+/y2/z3/data"
"topic1/x1/+/y3/data"
"topic1/x1/+/+/data"
"topic1/+/y2/+/data."
Conversely, the subscription "topic1/x1/+/z2/data" would not match to the published topic string above of: "topic1/x1/y2/z3/data."

In an example, an IoT device can connect to a hub device to obtain messages from the IoT service 114 and/or provide messages to the IoT service. In an embodiment, the IoT device includes a consumer product used in the home, or it may be a commercial, industrial, agricultural, or other business computing device. The IoT device, in various embodiments, includes a form of networking hardware, a processor, memory, and capability to communicate over a network (such as, but not limited to, Bluetooth, Bluetooth Low Energy (BLE), Wi-Fi, ZigBee (an IEEE 802.15.4-based specification for a suite of high-level communication protocols), Z-Wave (a mesh network using low-energy radio waves), NFC (Near Field Communication), digital radio transmission, wired connection, and other such technologies).

In an embodiment, the IoT service 114 uses identification information of the entities and/or the IoT devices to store, in a subscription database or other storage device, topic subscriptions for the entities and/or the IoT devices. In an embodiment, the IoT service 114 references the subscription database to route received messages to the entities and/or the IoT devices that subscribe to topics of those received messages. For example, the IoT service 114 receives IoT device data (e.g., temperature data) from an IoT device (e.g., smart thermostat) and publishes or otherwise provides the IoT device data as a payload to the IoT communicator 106 which in turn transmits the payload, over the notification bus 102, to be executed by the scripted object(s) 120 (e.g., modify the temperature in the game environment based at least in part on the temperature data). In yet other embodiments, the IoT communicator 106 obtains payload from the IoT services and the game engine 118 provides the payloads to the payload converter 108 which converts the payload into an executable object. In various embodiments, the payload includes structured, unstructured, and/or semi-structured data. In one example, the payload includes JavaScript Object Notation (JSON) objects.

In various embodiments, the IoT device data may be defined in accordance with a first schema. In other words, the first schema may define various fields, entries, parameters, etc. in the IoT device data received from the IoT device. In such embodiments, a payload converter converts the IoT device data in the first schema to a second schema utilized by the game engine 118 and/or scripted object(s) 120. For example, temperature data from an IoT device is received as a floating-point value in Celsius and the game engine 118 requires temperature data as an integer value in Fahrenheit. In such examples, the payload converter 108 converts or otherwise transforms the payload and/or data within the payload (e.g., particular data fields within a JSON data object) prior to use by the game engine 118. In another example, rotation information generated by an IoT device is indicated in degrees whereas the scripted object(s) 120 define rotation information in quaternion. In these examples, the payload converter 108 converts rotation information from degrees to quaternion for payloads directed to entities within the game engine and from quaternion to degrees for payloads directed to the IoT service 114. In other words, the payload converter 108, in various embodiments, converts or otherwise transforms data between different formats representing the same information (e.g., between Celsius and Fahrenheit).

In various embodiments, the IoT service 114 includes executable code or other logic that generates commands for the game engine 118 or other entity (e.g., the hub device 304 described in greater detail below in connection with FIG. 3). In one example, the scripted object 120 causes a payload to be transmitted over the request bus 104 to the IoT communicator 106 which provides the payload to the IoT service 114, in response, the IoT service 114 generates a command or other communication based at least in part on the payload. Turning to a specific example, a user playing a game executed by the game engine 118 causes the temperature within the game environment to change, as a result, a payload is provided to the IoT service 114 and the IoT service 114 generates a command to a smart thermostat in a physical environment to change one or more temperature settings and/or communicates with a smart thermostat client application to indicate the change in temperature in the game environment. Similarly, the game engine 118, in various embodiments, is registered as an IoT device with the IoT service 114 and obtains payloads from the IoT service 114. In such embodiments, the game engine 118 can include executed code or other logic that performs operations in response payloads.

In various embodiments, the IoT device data is received from a plurality of IoT devices (e.g., tractors, sprinklers, temperature sensors, water sensors, etc.). Furthermore, the IoT device data includes, in various embodiments, sensor data, data generated at the device from analysis, data aggregated at the device and/or device state data. This IoT device data is provided to the IoT service 114 over a network such as the network 704 described below in connection with FIG. 7. Furthermore, Application Programming Interface (API) calls, procedure calls or other network commands that may be made in relation to the modules and services included in the environment 100 (e.g., IoT service and/or game engine 118) and may be implemented according to different technologies, including, but not limited to, Representational state transfer (REST) technology or Simple Object Access Protocol (SOAP) technology. In one example, REST is an architectural style for distributed hypermedia systems. A RESTful API (which may also be referred to as a RESTful web service) is a web service API implemented using HTTP and REST technology in accordance with an embodiment. In addition, in an embodiment, SOAP is a protocol for exchanging information in the context of Web-based services.

The network (not shown in FIG. 1 for simplicity), for example, includes any computing network, including an intranet, the Internet, a local area network, a wide area network, a wireless data network, or any other such network or combination thereof. In various embodiments, components utilized for the network depend at least in part upon the type of network and/or environment selected. In one example, communication over the network may be enabled by wired or wireless connections and combinations thereof. In various embodiments, the network enables communication between the IoT service 114 and the game engine 118. In one example, the game engine 118 connects to the IoT service 114 as an IoT device and the IoT service 114 manages connections between the game engine 118 (and/or entities managed by the game engine 118) and other IoT devices.

As described above, the game engine 118 provides tools and features that are accessible using particular commands (e.g., API calls) which may include arguments (e.g., additional data such as a command 'set light intensity' accepting an integer values between 0 and 100 as an argument) in accordance with an embodiment. These commands can be triggered, in accordance with an embodiment, based at least in part on executable logic included in the scripted object(s) 120. For example, a particular scripted object 120 includes source code or other executable logic that, as a result of being executed, generates a command 'set light intensity' that causes the game engine 118 to modify an attribute (e.g., intensity) of one or more entities (e.g., lights) within the game environment. Furthermore, as described above in various embodiments, the IoT communication 106 obtains a payload from an IoT device (e.g., smart lightbulb) that represents intensity of a light associated with the IoT device, the payload converter 108 then converts the payload or a portion thereof (e.g., the portion of the JSON data object that includes data representing the intensity of the light) into the command 'set light intensity' (e.g., the command including a value representing intensity in accordance with the format associated with the command) for execution by the game engine 118.

Furthermore, the payload converter 108, in various embodiments, performs other transformations on data such as translation, rotation, and scale in order to convert data from a first schema associated with the IoT service 114 to a second schema associated with the game engine 118. In other embodiments, the payload converter 108 determines a format for the payload based at least in part on data included in the payload. In one example, the payload includes a JSON data object that defines values for red, green, and blue, the payload converter 108, based at least in part on this data, determines that the payload includes color information for lights in the game environment and converts the payload to the corresponding format expected by the game engine 118.

In various embodiments, the commands included in the scripted object(s) 120 include calls to other commands and/or scripted objects 120. For example, a first scripted object associated with a light in the game environment includes executable logic that matches color and intensity data from an IoT device in a physical environment (e.g., a smart lightbulb in a home) and, when the color is set to a particular value (e.g., blue) it causes a second scripted object to be executed that performs additional operations (e.g., spawns a character within the game environment at a particular location). In this manner, operations can be nested or otherwise conditioned on the occurrence of one or more events either in the game environment or the physical environment in accordance with an embodiment. Furthermore, in various embodiments, the commands including nested and/or conditional commands are executed asynchronously. Returning to the example above, setting the light color to blue spawns the character within the game environment after an interval of time has elapsed. In various embodiments, this effect (e.g., nested and/or conditional command) can be achieved using various techniques such as the IoT service transmitting multiple commands, the IoT service transmitting a first command to the game service which then sends multiple commands, or the IoT service transmitting a first command to a first entity which in turn sends a second command to a second entity.

Figure 2:
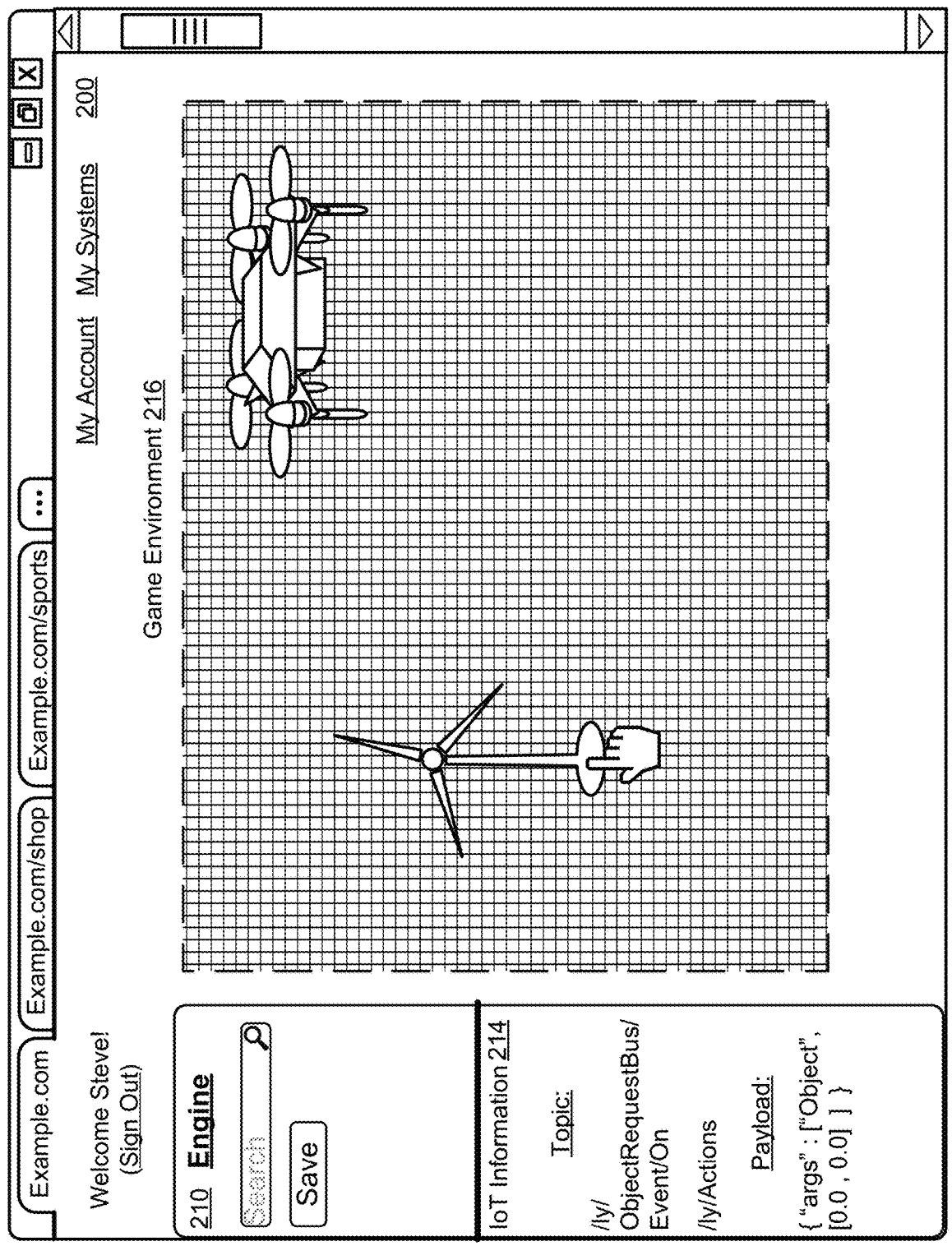
FIG. 2 shows an illustrative example of a management console presented in a user interface of a client device for generating workflows in accordance with an embodiment.

FIG. 2 shows an interface 200 of a game engine which may be displayed by an application executed by a computing system enabling a developer to interact with various tools and features provided by the game engine in accordance with an embodiment. As illustrated in FIG. 2, the interface 200 includes various graphical user interface elements, such as an "IoT Information" 214 pane, that enables the developer to create, modify, and/or delete IoT information associated with entities within a game environment 216 represented in the interface 200. As described above, the IoT information includes information used to subscribe and publish to topics, transmit and obtain payloads, perform operations in response to data to include in the payload, communicate between entities and/or IoT device, and other operations described in the present disclosure. In various embodiments, the developer interacts with the game engine by issuing commands through the interface 200. For example, the developer through the interface 200 configures the game engine and/or IoT service to communicate and/or controls entities within the game engine and/or IoT devices. The interface 200 may be displayed by various applications, such as a mobile application or web browser.

For instance, on the left-hand side of the interface 200, various commands can be selected by the developer causing various operations to be performed by the application displaying the interface 200 and/or other services such as the workflow generator. In this example, the interface 200 includes various features of the game engine such as a 'search' and a 'save' feature. The 'search' feature, in an embodiment, enables the developer to search for particular entities by name. In various embodiments, the name is unique to the entity within the game environment and corresponds to the identifier provided to the IoT service to subscribe the entity to one or more topics. In various embodiments, the 'save' feature allows the developer to save various aspects of the game environment 216.

In various embodiments, the developer utilizes the interface 200 to interact with and create the game environment 216. In addition, in various embodiments, the developer utilizes the interface 200 to register the game engine and/or entities with the IoT service and create scripted objects associated with entities to perform various operations described in the present disclosure. For example, as illustrated at FIG. 2, the developer has generated (using the interface) two entities (e.g., a wind turbine and a drone) within the game environment 216. In addition, as illustrated at FIG. 2, the developer can select an entity (e.g., the wind turbine) and view, create, and/or edit IoT information associated with the entity using the IoT information pane 214. This information (including scripted objects) is used by the game engine and/or IoT service to enable communication and control of the entities and/or IoT devices as shown in greater detail below in connection with FIGS. 3 and 4.

The interface 200, in various embodiments, correspond to operations that may be taken to manage or otherwise control tools and features provided by the game engine as described in the present disclosure. In this example, the links appear as textual words which enable the links to be selected using an appropriate input device such as a keyboard, mouse, touchscreen, or other input device. Selection of one of the commands from the interface 200, in various embodiments, causes an application displaying the interface 200 to submit, pursuant to a Uniform Resource Locator (URL) associated with the selected command by the programming of the interface 200, a request, such as an HTTP request, for the content associated with the command to a server that provided the interface 200 or another server. For example, by selecting the "Save" command, the developer causes information associated with the game environment 216 (e.g., entities, IoT information, scripted objects) created in the interface 200 to be saved. In other embodiments, selection of one of the commands from the interface 200 causes an application displaying the interface 200 to cause a client device executing the game engine to perform the commands. In various embodiments, the game environment 216 illustrated in FIG. 2, can represent an environment in any number of dimensions.

Figure 3:
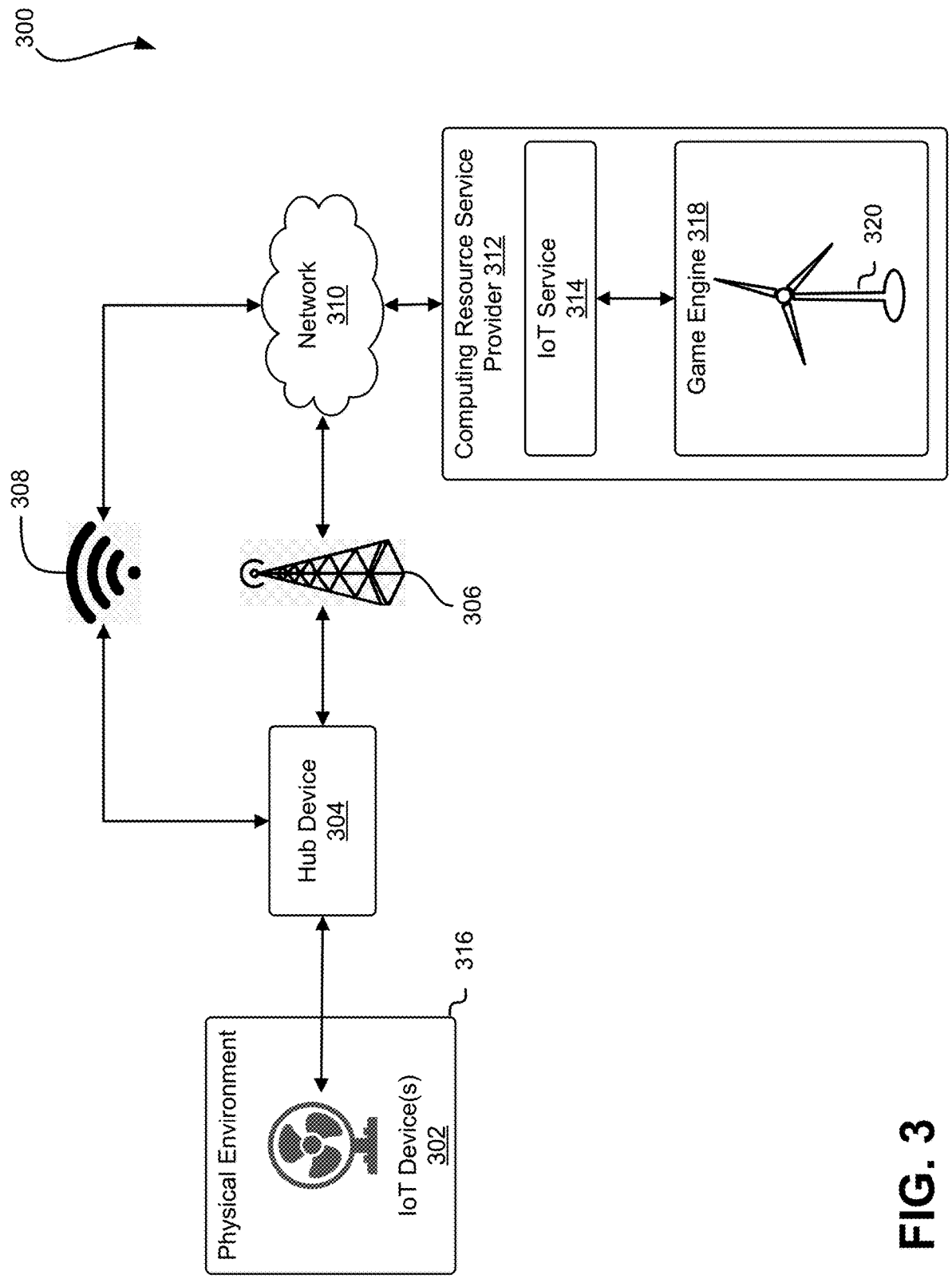
FIG. 3 shows an illustrative example of an environment in which a game engine utilizes an IoT service to enable communication with scripted objects associated with the game engine and computing devices in accordance with an embodiment.

FIG. 3 illustrates an example of an environment 300 in which IoT device(s) 302 communicate with entities 320 within a game environment generated by a game engine 318 through a hub device 304 and an IoT service 314 in accordance with an embodiment. In particular, the illustrated embodiment includes a plurality of IoT device(s) 302 communicatively coupled over local communication channels to a hub device 304 which is itself communicatively coupled to a computing resource service provider 312 and/or services therefore such as the IoT service 314 over the network 310. In various embodiments, the IoT device(s) 302 are provisioned to be locally connected to the hub device 304, exchange data via the hub device 304, and communication and control operations of the IoT device(s) 302 are managed by the hub device 304 through the local communication channels.

The IoT device(s) 302, in an embodiment, are equipped with various types of sensors to collect information about the IoT device(s) 302 and the physical environment 316 surrounding the IoT device(s) 302 and provide the collected information to the hub device 304, which then relays the collected information to the computing resource service provider 312 and/or IoT service 314 (e.g., payloads published to a particular topic as described above). Furthermore, as described above, in various examples, some or all of the IoT device(s) 302 perform a specified function in response to control commands sent through the hub device 304. For example, in response to a first entity in the game environment (e.g., the wind turbine illustrated in FIG. 3) being turned on, the hub device 304, in response to obtaining a payload from the IoT service 314 generated based at least in part on a status change of the first entity (e.g., changing from 'off' to 'on'), transmits a command to a first IoT device (e.g., represented as a fan in FIG. 3) to turn on. Various specific examples of information collected by the IoT device(s) 302 include audio and images captured by the camera sensors attached to the IoT device(s) 302, in which the hub device 304 controls several aspects of capture operations including the time in which audio needs to be captured. In one embodiment, the IoT device(s) 302 include a user input device designed to record user selections and send the user selections to the hub device 304, the computing resource service provider 312, and/or IoT service 314. In another embodiment, the IoT device(s) 302 include a wearable device comprising one or more sensors that collect data of the physical environment 316 which can be provided to the hub device 304.

In one embodiment, the hub device 304 includes a cellular radio to establish a connection to the network 310 via a cellular service 306 such as a 4G (e.g., Mobile WiMAX, LTE) or 5G cellular data service. Alternatively, or in addition, the hub device 304 may include a WiFi radio to establish a WiFi connection 308 through a WiFi access point or router which couples the hub device 304 to the network 310 (e.g., an Internet service provided by an internet service provider to the end user). In several embodiments, it should be noted that the underlying principles of the disclosure are not limited to any particular type of communication channel or protocol.

In one embodiment, the IoT device(s) 302 include ultra low-power devices capable of operating for extended periods of time on battery power (e.g., years). To conserve power, the local communication channels may be implemented using a low-power wireless communication technology such as Bluetooth Low Energy (LE). In this embodiment, the IoT device(s) 302 and the hub device 304 are equipped with Bluetooth LE radios and protocol stacks. Additionally, the IoT device(s) 302, for example, establish short-range communication channels with the hub device 304 using various technologies, such as induction wireless, infrared wireless (such as technologies operating according to specifications and protocols provided by the Infrared Data Association, or IrDA), Z-wave, Zigbee, RuBee, IrDA, Thread, Bluetooth, Insteon, LoWPAN, Highway Addressable Remote Transducer Protocol (HART), supervisory control and data acquisition (SCADA) systems, industrial fieldbus protocols used for real-time distributed control of industrial systems (such as those standardized under IEC 61158), Near Field Communication (NFC), 802.15.4 protocols, or ultra wideband formats.

In some embodiments, the IoT device(s) 302 may utilize short-range, low-power and high-frequency radio transmissions. In still other embodiments, the IoT device(s) 302 may support acoustic-based data transfer. For example, a hub device 304 may include software components and a speaker that enable the hub device 304 to broadcast data to one or more IoT device(s) 302 as sound waves, while the short-range communication device may include software components and a microphone that enable the hub device 304 to receive the data embedded in the sound waves. Thus, IoT devices, in various embodiments, use one or more of radio signal-based data transfer (e.g., near field communication (NFC) or Bluetooth), light-based data transfer (e.g., infrared data transfer), an acoustic-based data transfer (e.g., sound wave-embedded data), or magnetic field-based transfer (e.g., reading data from a magnetic stripe) for inter-device communication. Generally, protocols and components for enabling computing devices to perform the systems and methods of various embodiments described in the present disclosure are not limited to those explicitly illustrated herein.

In one embodiment, the hub device 304 includes a user device that allows users to access and configure the connected IoT device(s) 302 and/or interact with computing resource service provider 312 and/or a component thereof In several embodiments, the hub device 304 includes devices such as tablet computing devices, voice-controlled devices, televisions, set-top boxes, smart watches, mobile telephones, laptop computers, or the like. In these embodiments, the hub device 304 includes a client application (e.g., interface 200 of the game engine described above in connection with FIG. 2) that manages one or more operations of the IoT device(s) 302 and/or entities 320. In other embodiments, the hub device 304 may be a network router in which the hub device 304 simply facilitates communications between IoT device(s) 302 and entities 320.

In one embodiment, the hub device 304 may interact with an application server (e.g., application server 708 of FIG. 7) of the computing resource service provider 312 through the network 310 that provides one or more services, including the game engine 318 that provides JSON data objects generated at least in part by the entities 320. In various embodiments, the IoT device 302 device, the IoT service 314, the hub device 304, and/or other components illustrated in FIG. 3 access one or more application servers through a web server (e.g., web server 706 of FIG. 7) which receives requests and provides the response generated by the application server. Further, the computing resource service provider 312 may include the IoT service 314 which may store and retrieve payloads from a data store (e.g., data store 710 of FIG. 7) and provide the payloads to the IoT device(s) 302 and/or entities 320.

In an alternative embodiment, additional connection options may be available for one or more hub devices, including hub device 304. In this embodiment a single user may be associated with multiple hub devices (including hub device) installed onsite at a single premise (e.g., a manufacturing facility). The hub devices can be positioned within the premise to extend the wireless range needed to connect all of the IoT device(s) 302. In one embodiment, the hub devices establish a direct connection to the computing resource service provider 312 through a cellular service 306 or WiFi connection 308 to enable communication and control between the IoT device(s) 302 and the entities 320. In another embodiment, one of the hub devices may act as a "primary" hub which provides connectivity and/or local services to all of the other hub devices on the premises. For example, the primary hub device (e.g., hub device 304) may be the only hub device to establish a direct connection to the computing resource service provider 312. In one embodiment, only the "primary" hub device is equipped with a cellular communication interface to establish the connection to the computing resource service provider 312. As such, all communication between the computing resource service provider 312 and the other hub devices will flow through the primary hub device. In this role, the primary hub device may be provided with additional program code to perform filtering operations on the data exchanged between the other hub devices and computing resource service provider 312.

In various embodiments, regardless of how the hub devices are connected with the IoT device(s) 302, the computing resource service provider 312 associates the hubs with a single premise and combines all of the attached IoT device(s) 302 under a single comprehensive user interface, accessible via a user device with a client application and/or a browser-based interface. In several embodiments, a virtually unlimited number of such hub devices, IoT device(s) 302, and entities 320 can be communicative couples using the IoT service 314. In one embodiment, the two or more premises are configured for a single user. In addition, the game engine 318, in various embodiments, can be used to generate a digital copy and/or representation of the physical environment 316 (e.g., a premises). Furthermore, the computing resource service provider 312 and/or IoT service 314 logically associate the hub devices, IoT device(s) 302, and/or entities 320 with the user and are manageable under a single comprehensive user interface, accessible via a user device with a client application and/or a browser-based interface.

In an alternate embodiment, one or more IoT device(s) 302 are connected to one another through short-range communication channels, in which the other IoT device establishes a connection with the hub device on behalf of the other IoT device(s) 302 connected therewith. In other embodiments, the IoT device(s) 302 communicate directly with the computing resource service provider 312 through the network 310. In these embodiments, such IoT device(s) 302 can serve as a hub device for IoT device(s) 302.

As described above, in various embodiments, operations of the entities 320 cause the game engine 318 to publish data to topics associated with the entities 320. In turn, the IoT device distributes the data (e.g., payloads) published to the topics to the hub device 304 so that the hub device 304 can forward the payloads to the IoT device(s) 302 based at least in part on the IoT device(s) subscribing to the topics. Furthermore, in various embodiments, the IoT service 314 includes source code or other executable logic that determines conditions for publishing payloads to a topic. For example, the IoT service 314 can, based at least in part on executable logic, transmit payloads to the IoT device(s) 302 and/or hub device 304 only when a value within the payload reaches a certain threshold and/or value. In a specific example, the IoT service 314 only transmits a payload to the hub device 304 if the value indicated for the fan speed of the wind turbine illustrated in FIG. 3 within the game environment exceeds a threshold. Furthermore, in various embodiments, the payload can include a command or other information in addition to or instead of the data (e.g., JSON data object) generated by the entity (e.g., the wind turbine within the game environment). For example, the IoT service 314 transmits a command to turn the temperature associated with a thermostat managed by the hub device 304 down.

In various embodiments, the entities 320 and/or game engine 318 can send and receive communication without the game engine 318 executing a particular game (e.g., while a developer is authoring the game environment and the game engine is not executing the game environment such as when a user plays the game). In other words, entities 320 associated with a particular game can perform the operations described in the present disclosure without the game engine 318 executing the particular game. For example, the game engine 318 can obtain a payload from the IoT service 314 in response to the IoT service 314 publishing the payload to a particular topic and perform an operation (e.g., stop the wind turbine) based at least in part on the payload without the game executing. In this manner, the tool and features of the game engine 318 are exposed to the IoT service 314, IoT devices 302, and/or users. For example, as described above, the IoT service 314 can include source code or other executable logic that obtains payloads from the IoT device(s) 302 and converts or otherwise determines commands to transmit to the game engine 318 based at least in part on data included in the payloads.

Figure 4:
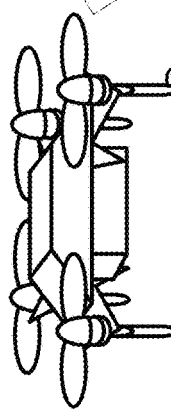
FIG. 4 shows an illustrative example of an environment in which a game engine utilizes an IoT service to enable communication with scripted objects associated with the game engine in accordance with an embodiment.
Figure 4:
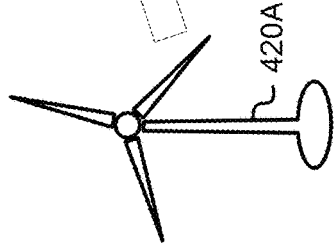

FIG. 4 illustrates an example of an environment 400 in which entities within a game environment communicate through an IoT service 314 in accordance with an embodiment. In the embodiment illustrated by environment 400, a game engine 418 supports a first entity 420A (illustrated as a wind turbine in FIG. 3) and a second entity 420B (illustrated as a drone in FIG. 3). As described above, a user can, utilizing an interface, cause the game engine to create the first entity 420A and the second entity 420B and provide IoT information for the entities. In various embodiments, the first entity 420A and the second entity 420B are associated with corresponding scripted objects that include source code or other executable logic to perform various operations described in the present disclosure. In one example, a first scripted object associated with the first entity 420A caused the game engine 418 and/or component thereof (e.g., an IoT communicator as described above in connection with FIG. 1) to subscribe the first entity 420A to a topic provided by the IoT service 418.

In various embodiments, the IoT service 414 includes a service provider by the computing resource service provider 412, such as the IoT service 314 described above in connection with FIG. 3. Similarly, the computing resource service provider 412 includes an entity such as the computing resource service provider 312 described above in connection with FIG. 3. Returning to FIG. 4, in various embodiments, the IoT service 414 publishes payloads to the game engine 418 and/or entities (e.g., the first entity 420A and the second entity 420B that are subscribed to the topics associated with the payloads. For example, the second entity 420B is subscribed to the topic associated with the first entity 420A and the IoT service obtains payloads from the first entity 420A over the topic and publishes the payloads to the second entity 420B based at least in part on the second entity 420B subscribing to the topic. As described above, the topics managed by the IoT service 414, in an embodiment, are assigned unique names that correspond to the entity. In one example, the topic for the first entity 420A is "/topic/firstentityrequestbus/setfanspeed." The IoT service 414, in various embodiments, can maintain a plurality of topics for a single entity and/or IoT device. For example, the first entity 420A can be associated with a first topic to publish status information (e.g., fan speed) and a second topic to control actions (e.g., turn on or off).

In various embodiments, the game engine 418 also registers with the IoT service 414 as an IoT device. Although the IoT service and the game engine illustrated in FIGS. 3 and 4 are being provided by a single computing resource service provider 412, the IoT service 414 and game engine 418 can be provided by different entities in accordance with various embodiments described in the present disclosure.

Figure 5:
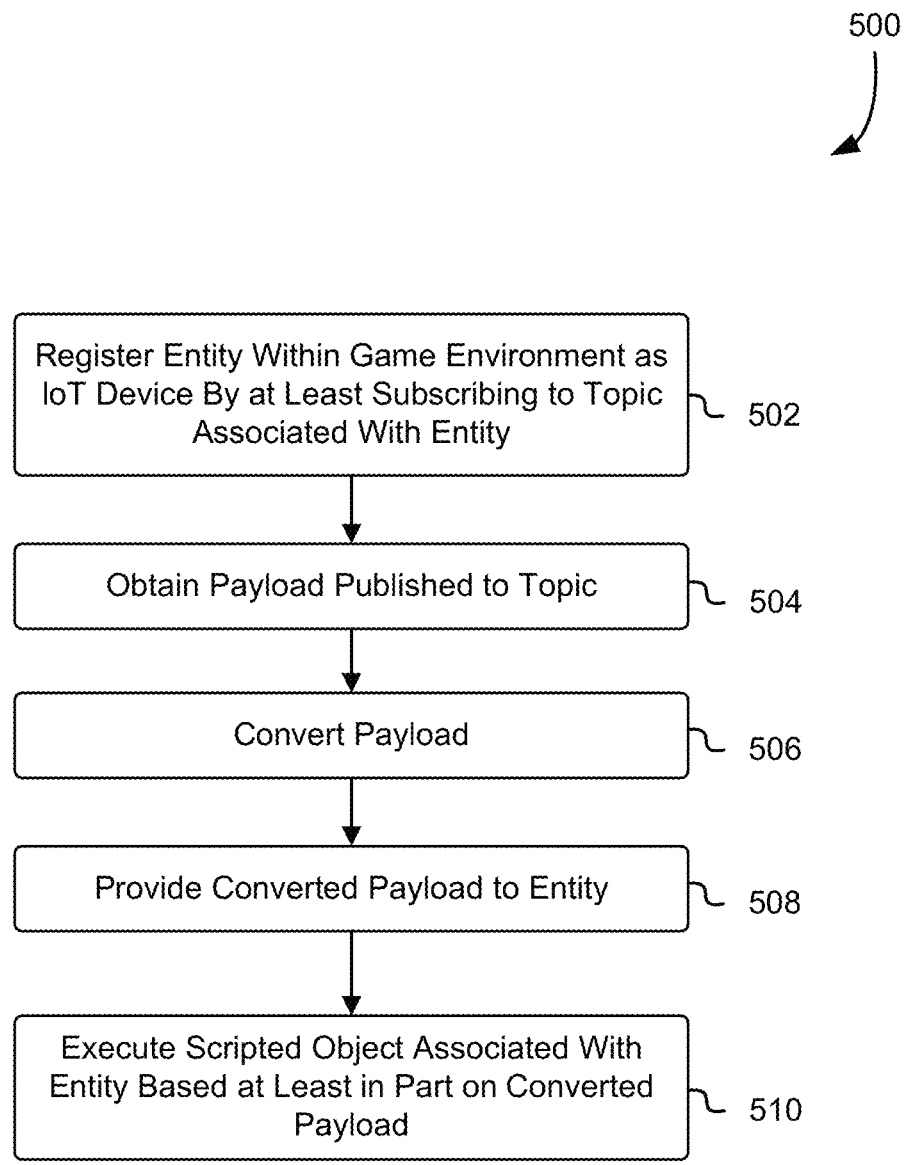
FIG. 5 shows an illustrative example process for enabling communication with scripted objects associated with a game engine in accordance with an embodiment.

FIG. 5 shows a process 500 for communicating with an entity within a game environment using an IoT service in accordance with at least one embodiment. The process 500, in an embodiment, is performed by a game engine or other service as described above. Now referring to FIG. 5, the blocks of processes 500, described in the present disclosure, in various embodiments, include a computing process that is performed using any combination of hardware, firmware, and/or software. The various functions, processes, and/or operations described in the present disclosure may be carried out by a processor executing instructions stored in memory. The processes, for example, are embodied as computer usable instructions stored on computer storage media. In addition, in some embodiments, the processes are provided by a standalone application, a service or hosted service (standalone or in combination with another hosted service), or a plug-in to another product, to name a few. In addition, the processes 500 are described, by way of example, with respect to the computer systems of FIGS. 2 and 3. However, these processes may additionally or alternatively be executed by any one system, or any combination of systems, including, but not limited to, those described in the present disclosure. In addition, various blocks of the processes 500 may be performed in different and/or alternative orders, performed in serial or parallel, or omitted entirely.

Returning to FIG. 5, the system executing the process 500, at block 502 registers the entity within the game environment with an IoT service by at least subscribing to a topic associated with the entity. For example, the game engine transmits identification information associated with the entity to the IoT service and indicates the topic to subscribe the entity to (e.g., an appropriately configured API call), in response the IoT service records the identification information associated with the topic such that when the IoT service publishes updates to the topic the corresponding payload is provided to the entity. As described above, the IoT service manages topics which enables IoT devices and/or entities to publish data to topics and obtain data published to topics to which they are subscribed. Furthermore, in various embodiments, a scripted data object includes executable logic that causes the game engine to register the entity as an IoT device (e.g., subscribe to a particular topic) with the IoT service. In one example, the entity subscribes to a single topic (e.g., a topic configured to obtain and publish status changes associated with the entity). In yet other embodiments, the entity subscribes to a plurality of topics. Furthermore, in an embodiment, the game engine provides payloads associated with the topic and/or generated by the entity to the IoT service. For example, the entity, in response to a status change, generates and/or causes to be generated (e.g., executable logic that causes the game engine to perform the operations) a payload indicating the status change which is transmitted to the IoT service by the game engine.

In various embodiments, the system executing the process 500, at block 504 obtains a payload published to a topic. For example, the IoT service obtains a payload from an IoT device and publishes the payload to all the subscribers, including the entity, of the topic. In another example, the IoT service obtains the payload from another entity within the game environment. In various embodiments, the system executing the process 500, at block 506 converts the payload to a format useable by the game engine, entity, and/or scripted object. As described above, in various embodiments, payloads obtained from the IoT service are generated in accordance to a first schema that is distinct from a second schema utilized by the game engine. In such embodiments, the game engine includes a payload converter to convert the payload from the first schema into data useable by the game engine (e.g., the second schema). In yet other embodiments, the IoT service includes executable logic that converts payloads into commands or other data useable by the game engine. In still other embodiments, for example, where the payload is generated by an entity within the game environment, no conversion is needed and this block is omitted.

In various embodiments, the system executing the process 500, at block 508 provides the converted payload to the entity. As described above, the game engine, in an embodiment, provides a notification bus to provide converted payloads to scripted objects associated with the entity. In one example, the payload converter generates an executable object based at least in part on data included in a JSON data object and the scripted object associated with the entity. In various embodiments, the system executing the process 500, at block 510 executes the scripted object associated with the entity based at least in part on the converted payload. For example, the converted payload includes color and intensity values for a light feature provided by the game engine and the scripted object includes source code or executable logic that, as a result of being executed, sets the color and intensity value for a particular light within the game environment to the values included in the converted payload.

Figure 6:
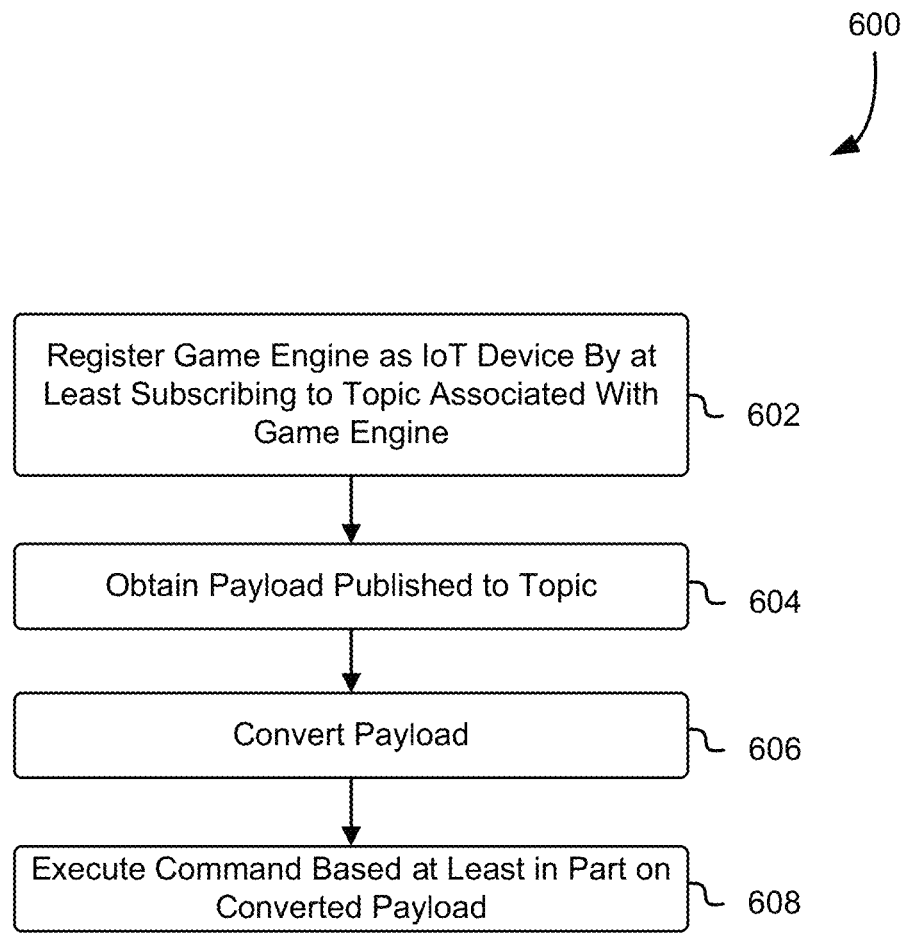
FIG. 6 shows an illustrative example process for registering a game engine as an IoT device with an IoT service in accordance with an embodiment.

FIG. 6 shows a process 600 for registering a game environment as an IoT device with an IoT service in accordance with at least one embodiment. The process 600, in an embodiment, is performed by a game engine or other service as described above. Now referring to FIG. 6, the blocks of processes 600, described in the present disclosure, in various embodiments, include a computing process that is performed using any combination of hardware, firmware, and/or software. The various functions, processes, and/or operations described in the present disclosure may be carried out by a processor executing instructions stored in memory. The processes, for example, are embodied as computer usable instructions stored on computer storage media. In addition, in some embodiments, the processes are provided by a standalone application, a service or hosted service (standalone or in combination with another hosted service), or a plug-in to another product, to name a few. In addition, the processes 600 are described, by way of example, with respect to the computer systems of FIGS. 2 and 3. However, these processes may additionally or alternatively be executed by any one system, or any combination of systems, including, but not limited to, those described in the present disclosure. In addition, various blocks of the processes 600 may be performed in different and/or alternative orders, performed in serial or parallel, or omitted entirely.

Returning to FIG. 6, the system executing the process 600, at block 602 registers the game engine with the IoT device by at least subscribing to a topic associated with the game engine. For example, the game engine transmits identification information associated with the game engine to the IoT service and indicates the topic to subscribe the game engine to (e.g., an appropriately configured API call), in response the IoT service records the identification information associated with the topic such that when the IoT service publishes updates to the topic the corresponding payload is provided to the game engine. This enables the game engine to expose functionality as an IoT device. In addition, as described above, in various embodiments, the IoT service includes executable code or other logic that generates commands for the game engine and transmits the commands using IoT communication protocols as a result of the game engine being registered as an IoT device.

As described above, the IoT service manages topics which enables IoT devices and/or entities to publish data to topics and obtain data published to topics to which they are subscribed. Furthermore, in various embodiments, the game engine includes executable logic that causes the game engine to register as an IoT device (e.g., subscribe to a particular topic) with the IoT service. In one example, the game engine subscribes to a single topic. In yet other embodiments, the game engine subscribes to a plurality of topics (e.g., different topics for different types of communication and control operations).

In various embodiments, the system executing the process 600, at block 604 obtains a payload published to a topic. For example, the IoT service obtains a payload from an IoT device and publishes the payload to all the subscribers, including the game engine, of the topic. In another example, the IoT service obtains the payload from another entity within the game environment. In an embodiment, the payload is modified before the game engine obtains the payload published to the topic. In another embodiment, the payload is generated based at least in part on data object by the IoT service.

In various embodiments, the system executing the process 600, at block 606 converts the payload to a format useable by the game engine and/or executable code associated with the game engine. As described above, in various embodiments, payloads obtained from the IoT service are generated in accordance to a first schema that is distinct from a second schema utilized by the game engine. In such embodiments, the game engine includes a payload converter to convert the payload from the first schema into data useable by the game engine (e.g., the second schema). In yet other embodiments, the IoT service includes executable logic that converts payloads into commands or other data useable by the game engine. In still other embodiments, for example, where the payload is generated by an entity within the game environment, no conversion is needed and this block is omitted.

In various embodiments, the system executing the process 600, at block 608 executes a command based at least in part on the converted payload. As described above, the game engine, in an embodiment, executes commands obtained from the IoT service included in one or more payloads. In one example, the payload converter generates an executable object based at least in part on data included in a JSON data object and one or more commands included in the payload. For example, the converted payload includes color and intensity values for a light feature provided by the game engine and the game engine includes source code or executable logic that, as a result of being executed, sets the color and intensity value for a particular light within the game environment to the values included in the converted payload.

Figure 7:
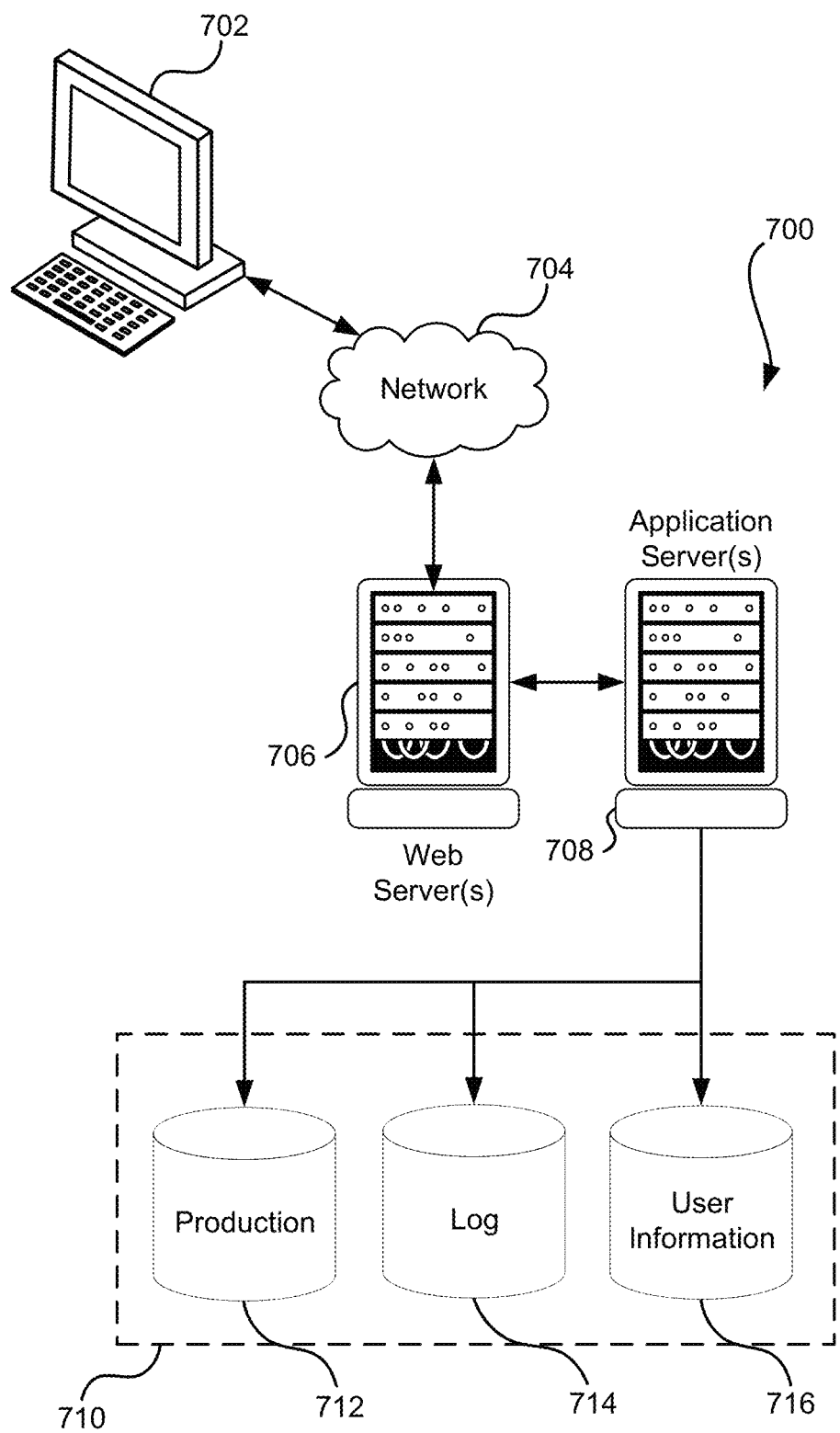
FIG. 7 illustrates a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof In an embodiment, the network includes the Internet and/or other publicly addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and a data store 710, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 702 and the application server 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 610.

The data store 710, in an embodiment, is operable, through logic associated therewith, to receive instructions from the application server 708 and obtain, update or otherwise process data in response thereto, and the application server 708 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In various embodiments described throughout this disclosure, computing resources are configured to perform tasks (e.g., generate data, process data, store data, route messages, transmit data, submit requests, process requests) by loading computer-readable executable instructions into memory that, as a result of execution by one or more processors, cause the one or more processors to execute instructions to perform tasks. In at least one embodiment, a computer system is configured to perform a task through a software application that controls the execution of specific commands, requests, tasks, jobs, and more. A computer system may be configured to execute computer-readable instructions encoded in a software application by loading executable code of the software application into memory and using one or more processors of the computer system to run the executable instructions.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B or C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
    connecting a game engine to an Internet of Things (IoT) service by at least subscribing the game engine to a first topic maintained by the IoT service and associated with the game engine;
    obtaining a first payload published to the first topic;
    causing the game engine to execute a command based at least in part the first payload;
    generating a first entity within a game environment managed by the game engine, the first entity associated with executable logic that, as a result of being executed, causes the game engine to perform an operation associated with the first entity;
    causing a first portion of the executable logic to be executed, the first portion of the executable logic causing the game engine to register the first entity by at least subscribing the first entity to a second topic associated with the first entity;
    obtaining a second payload published to the second topic; and
    causing a second portion of the executable logic to be executed based at least in part on the second payload, the second portion of the executable logic causing the game engine to perform the operation.

2. The computer-implemented method of claim 1, further comprising converting at least a portion of the first payload to a format executable by the game engine to generate a converted payload.

3. The computer-implemented method of claim 2, further comprising obtaining the second payload from the IoT service, the second payload generated by an IoT device within a physical environment.

4. The computer-implemented method of claim 3, wherein a second entity provides the second payload to a hub device implementing a message queuing telemetry transport (MQTT) protocol.

5. A system, comprising:
one or more processors; and
memory that stores computer-executable instructions that are executable by the one or more processors to cause the system to:
connect a game engine to an Internet of Things (IoT) service by at least subscribing to a first topic maintained by the IoT service;
register a first entity within a game environment generated based at least in part on an operation of the game engine with the IoT service by at least causing the game engine to subscribe the first entity to a second topic associated with the first entity;
provide, by the game engine, to the IoT service, data from the first entity to be published to the second topic;
obtain, from the IoT service, a payload associated with the first entity as a result of the first entity being subscribed to the second topic; and
provide, by the game engine, the payload to the first entity, the payload causing the game engine to execute source code associated with the first entity.

6. The system of claim 5, wherein the memory further includes computer-executable instructions that are executable by the one or more processors to cause the system to convert the payload from a first schema to a second schema such that data included in the payload is useable during execution of the source code associated with the first entity.

7. The system of claim 6, wherein the computer-executable instructions that cause the system to convert the payload from the first schema to the second schema further include computer-executable instructions that are executable by the one or more processors to cause the system to transform data included in the payload from a first format to a second format, where data in the first format represents the same information as data in the second format.

8. The system of claim 7, wherein the memory further includes computer-executable instructions that are executable by the one or more processors to cause the system to:
obtain a second payload associated with the first topic from the IoT service; and
cause a second entity to change a state in response to the second payload.

9. The system of claim 6, wherein the computer-executable instructions that cause the system to convert the payload from the first schema to the second schema further include computer-executable instructions are executable by the one or more processors to determine the second schema based at least in part on data included in the payload.

10. The system of claim 5, wherein the memory further includes computer-executable instructions that are executable by the one or more processors to cause the system to cause the game engine to transmit a second payload to the IoT service as a result of a status change of the first entity.

11. The system of claim 10, wherein the memory further includes computer-executable instructions that are executable by the one or more processors to cause the system to cause the IoT service to transmit the second payload to a second entity subscribed to the first topic.

12. The system of claim 11, wherein the second entity further comprises an object within the game environment generated by the game engine.

13. One or more of non-transitory computer-readable storage media that stores executable instructions that, as a result of being executed by one or more processors of a computer system, cause the computer system to:
register a game engine with an IoT service by at least subscribing to a first topic associated with the game engine, wherein the game engine comprises an entity that is registered as a result of subscribing to a second topic associated with the entity;
obtain, from the IoT service, a payload associated with the second topic; and
cause the game engine to perform an operation to the entity based at least in part on the payload.

14. The one or more non-transitory computer-readable storage media of claim 13, wherein the instructions further comprise instructions that, as a result of being executed by the one or more processors, cause the computer system to:
obtain a second payload from a first entity within a game environment generated based at least in part on an operation of the game engine; and
provide the second payload to the IoT service.

15. The one or more non-transitory computer-readable storage media of claim 13, wherein the instructions further comprise instructions that, as a result of being executed by the one or more processors, cause the computer system to:
obtain a second payload from the IoT service, the second payload associated with a second topic; and
determine, by the game engine, a set of entities within a game environment to provide the second payload to as a result of the set of entities within the game environment being subscribed to the second topic.

16. The one or more non-transitory computer-readable storage media of claim 13, wherein the instructions that cause the computer system to cause the game engine to perform the operation further include instructions that cause the computer system to modify an attribute of a first entity within a game environment based at least in part on data included in the payload.

17. The one or more non-transitory computer-readable storage media of claim 13, wherein the payload is associated with the entity.

18. The one or more non-transitory computer-readable storage media of claim 13, wherein the instructions that cause the computer system to cause the game engine to perform the operation further include instructions that cause the computer system to cause the game engine to perform the operation after an interval of time has elapsed since obtaining the payload.

19. The one or more non-transitory computer-readable storage media of claim 13, wherein the payload is generated based at least in part on the operation of an IoT device within a physical environment.

20. The one or more non-transitory computer-readable storage media of claim 13, wherein the payload further comprises a command generated by the IoT service based at least in part on data included in the payload.

* * * * *